United States Patent [19]

Boyle et al.

[11] Patent Number: 4,728,482
[45] Date of Patent: Mar. 1, 1988

[54] METHOD FOR INTERNAL INSPECTION OF A PRESSURIZED WATER NUCLEAR REACTOR PRESSURE VESSEL

[75] Inventors: David E. Boyle, Kiski Twp.; Edward J. Rusnica, Hempfield Twp., both of Pa.

[73] Assignee: Westinghouse Electric Corp., Pittsburgh, Pa.

[21] Appl. No.: 850,197

[22] Filed: Apr. 10, 1986

[51] Int. Cl.⁴ .............................................. G21C 17/00
[52] U.S. Cl. ..................................... 376/249; 376/245
[58] Field of Search ........................ 376/204, 249, 245

[56] References Cited

U.S. PATENT DOCUMENTS

| | | | |
|---|---|---|---|
| 4,368,644 | 1/1983 | Wentzell et al. | 376/249 |
| 4,421,715 | 12/1983 | Gunter et al. | 376/249 |
| 4,425,298 | 1/1984 | Shields | 376/249 |
| 4,429,329 | 1/1984 | Clemens et al. | 376/249 |
| 4,436,692 | 3/1984 | Stenabaugh | 376/204 |
| 4,515,747 | 5/1985 | Greek et al. | 376/249 |

*Primary Examiner*—Salvatore Gangialosi
*Attorney, Agent, or Firm*—D. C. Abeles

[57] ABSTRACT

An inservice inspection of a surface area or welds of a nuclear reactor pressure vessel is carried out, without the need to remove the core barrel and lower internals therefrom, by providing access to the annular chamber between the core barrel and the pressure vessel wall through an aperture in the upper flange of the core barrel. An inspection means, such as an ultrasonic testing device is inserted into the annular chamber through the access and positioned proximate the weld to be inspected and inspection of the weld effected by the device.

11 Claims, 4 Drawing Figures

METHOD FOR INTERNAL INSPECTION OF A PRESSURIZED WATER NUCLEAR REACTOR PRESSURE VESSEL

BACKGROUND OF THE INVENTION

The present invention relates to the inspection of a predetermined area of the surface inner wall, and welds, of a pressurized water nuclear reactor pressure vessel, whereby a method is provided to make such inspection without removal of the lower internals.

A typical pressurized water nuclear reactor includes a generally cylindrical pressure vessel which houses the heat generating reactor core, and a plurality of flow loops through which reactor coolant fluid is circulated. In each loop, coolant that is heated in the core is generally placed in heat exchange relation with a vaporizable fluid which is then used to drive tubine-generators. The coolant is then returned to the pressure vessel. In the pressure vessel there are contained the reactor vessel internals, the functions of which include support of the core components, such as fuel assemblies, and support of core monitoring apparatus. All of the supported load is transmitted through the wall of a core barrel, which surrounds the reactor core, to the reactor vessel. A baffle plate-former assembly is typically provided between the core barrel and the core, which is also supported by the core barrel. Coolant flow generally enters the pressure vessel, passes downwardly through an annulus formed between the core barrel and the pressure vessel wall, and then is turned 180° to flow upwardly through the core and then out of the pressure vessel.

The pressure vessel is normally of a generally cylindrical shape and has a cylindrical pressure vessel wall, which wall has inlet and outlet nozzles for conducting coolant, a hemispherical shaped bottom wall and a removable hemispherical shaped head. The cylindrical pressure vessel wall, because of its size, is normally formed of a plurality of sections that are welded together, and the cylindrical pressure vessel wall is also welded to the bottom head and wall so as to provide an integral primary pressure boundary for the coolant passed through the pressure vessel. The reactor vessel normally is formed as a thick walled carbon steel vessel that has a stainless steel cladding deposited thereon, on the interior surface.

Because of the pressurized state of the coolant within the pressure vessel, the vessel wall and welds therein are examined prior to placing a reactor in service. After the reactor has been placed in service, subsequent periodic examination of the pressure vessel wall and any welds are also required. This is referred to as "inservice" inspection. Normally, a complete examination of the reactor vessel wall and welds is required after an initial ten year period of service. In the event that a minor flaw is discovered in a weld during a routine examination, which flaw or "indication", is of such a minor nature that use of the vessel may be continued, it is necessary to make periodic subsequent inspections of that area at more frequent time intervals, such as each successive forty month period, in order to monitor and detect any aggravation of the flaw initially detected.

Inservice inspection of the inner surface of the pressure vessel wall and welds can be achieved by the removal of the reactor internals, both upper and lower internals, which completely exposes the inner wall surface. In some instances, however, it is disadvantageous to remove the complete reactor vessel internals for inspection purposes. It would be advantageous therefore, if inspection of the inner surface and welds of the pressure vessel could be effected without a need to remove the lower internals package of the reactor.

It is an object of the present invention to provide a method of inservice inspection of the inner surface and welds of a pressurized water reactor pressure vessel without removal of the lower internals of the reactor from the pressure vessel.

SUMMARY OF THE INVENTION

Inservice inspection of the inner wall surface and welds of a nuclear reactor pressure vessel, having a generally cylindrical, vertically oriented core barrel positioned within the pressure vessel, spaced from the wall of the pressure vessel to form an annular chamber therebetween, is effected by providing access to the annular chamber through the flange of the core barrel and inserting an ultrasonic or other testing means into the annular chamber proximate the area to be inspected. The core barrel has an outwardly extending flange that rests on the top of the pressure vessel wall, and normally contains a plurality of apertures therethrough, which communicate with the annular chamber, and which contain removable plugs, for the purpose of removing radiation specimens from the annular chamber. According to the present method, the plugs can be removed from existing apertures in the flange of the core barrel to provide access to the annular chamber, or additional apertures may be provided in the flange at predetermined locations to provide such access, with plugging of the additional apertures then effected. With access provided to the annular chamber, with the core barrel and lower internals in place, an inspection means, such as an ultrasonic testing device is insertable into the annular chamber and positioned proximate the weld or surface to be inspected, and inspection of the designated area carried out.

DETAILED DESCRIPTION

The present method provides a method for inservice inspection of a pressure vessel wall with the lower internals maintained in position within the pressure vessel.

Figure 1:
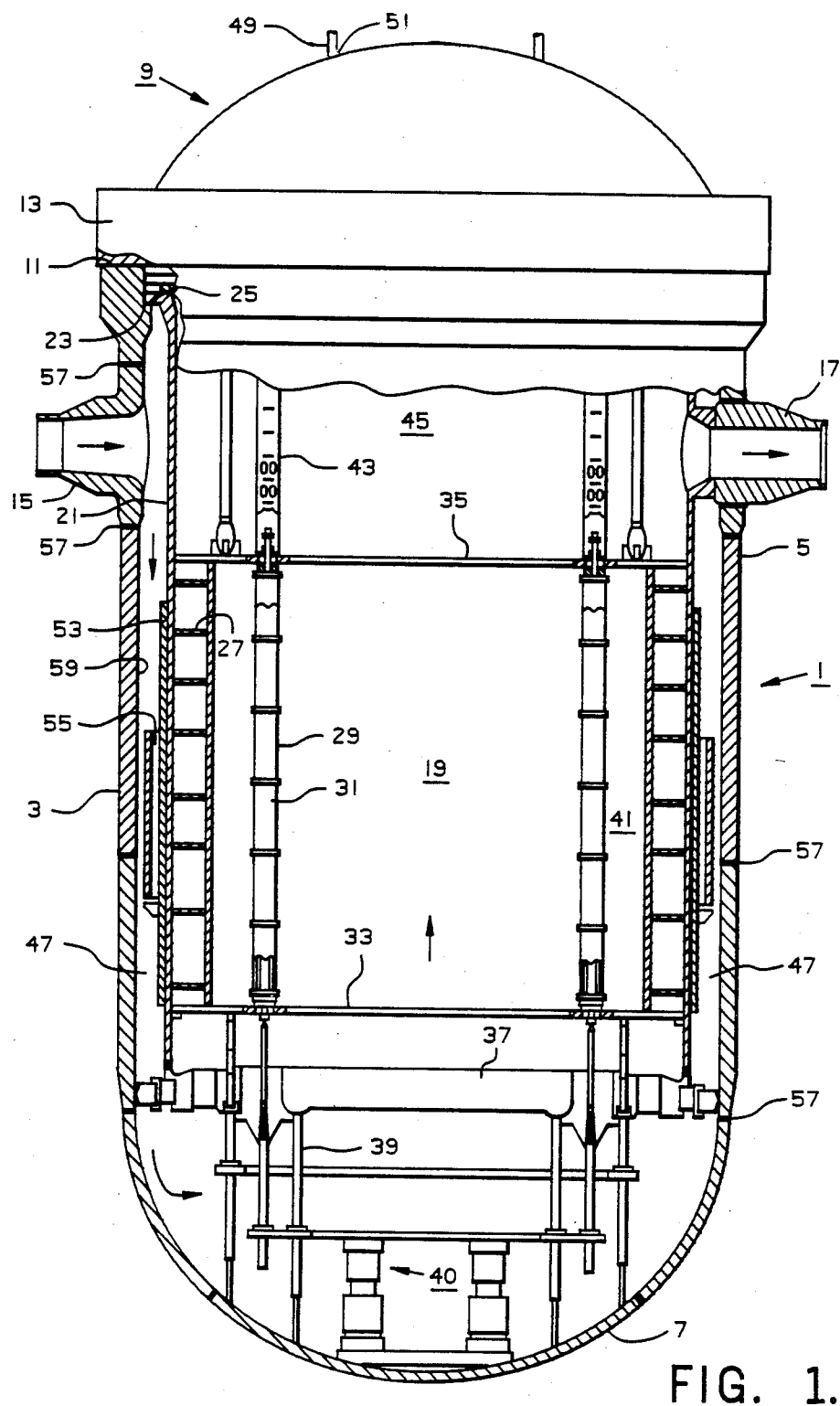
FIG. 1 is an elevational view, in cross-section, of a pressurized water reactor vessel and the reactor internals and fuel core contained therein.

A pressurized water nuclear reactor 1 is illustrated in FIG. 1, having a pressure vessel 3 which is of a generally cylindrical shape having a cylindrical wall 5, closed at the bottom by a bottom wall 7 of a hemispherical contour. The vessel is closed at the top by a flanged dome shaped head 9, which is secured, such as by bolts, to the top edge 11 of the pressure resistance wall 5, through the flanged portion 13, and is removable for refueling and inspection. The pressure resistant wall 5 has a plurality of inlet nozzles 15 and outlet nozzles 17, only one of each being shown, distributed about its periphery, a pair of each of such nozzles usually being provided.

A nuclear core 19 is supported in the lower region of the pressure vessel 3, the core being supported in spaced relationship to the bottom wall 7 by a core barrel 21. The core barrel has a flange 23 which rests on a ledge 25 in the top inner surface of the pressure resistant wall 5. A core former 27 is situated about the lower region of the core barrel 21. The core includes a series of fuel assemblies 29 and thimbles 31 for receiving control rods, not shown, with at least one such thimble 31 adapted for insertion therein of an instrument for monitoring the operation of the core. The fuel assemblies and thimbles are mounted between a lower core plate 33 and an upper core plate 35. The control rods, as is known, may contain rod clusters of high and lower absorption cross-section for neutrons, and serve to reduce the thermal power of the reactor, or otherwise control the same, through monitoring by use of the instrument in the dedicated thimble therefor, or to shut-down the reactor. A lower core support plate 37 is provided with support columns 39, and a secondary core support 40 is also provided, as illustrated. These components comprise the lower internals 41.

In the upper region of the pressure vessel 3, vertical guides 43 for the control rods and vertical guides for water displacement rods are provided, which generally comprise the upper internals 45.

The lower internals 41, containing the core 19, and upper internals 45 are mounted generally coaxially within the pressure vessel 3. An annulus 47 between the core barrel 21 and the pressure resistant wall 5 provides for communication between the inlet nozzles 15 and the lower end of the core 19. Drive rods 49 from the control rods extend through seals 51 in the head 9. Drive mechanisms (not shown) are used to properly position the control rods, axially. Affixed about the periphery of the core barrel 21 there are neutron shields 53, and a plurality of radiation specimen pockets 55, with specimens (not shown) for monitoring radiation, insertable into said pockets. In practice, the width of the annular chamber 47, between the pressure vessel wall 5 and the core barrel 21 is about six inches (15.24 cm), while the width is narrowed in the area of the specimen pockets 55, the distance between the outer wall of the specimen pocket and the pressure resistant wall being about four inches (10.16 cm). The outer circumference of the pressure vessel wall 5 is about 540 inches (13.716 m), which gives an indication of the size of the pressure vessel and area that requires periodic inspection.

In operation of the pressurized water reactor, coolant enters through the inlet nozzles 15 and flows downwardly through the annulus 47 to the bottom wall 7 and then upwardly through the core 19, into upper internals 45 and then transversely to, and outwardly from, the outlet nozzles 17, as indicated by the arrows shown in FIG. 1.

The pressure vessel 3 is constructed from a plurality of sectional units which are integrally connected together by welds. Such welds, illustrated as welds 57, may comprise welds between the bottom head and wall 7 and the cylindrical wall 5, and welds between sections of the cylindrical wall 5, such as about nozzles 15 and 17, and intermediate welds. It is to the internal inspection of these welds and of the inner surface 59 of the pressure vessel 3 to which the present method is directed.

Figure 2:
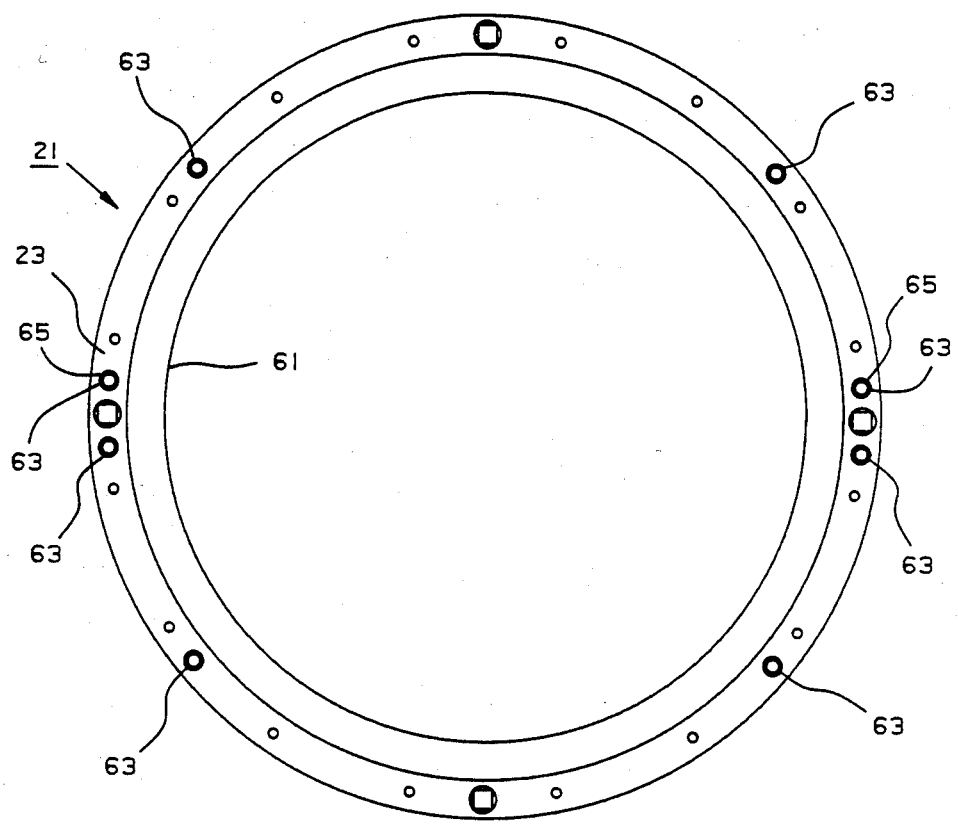
FIG. 2 is a plan view of the core barrel shown in FIG. 1, illustrating the top flange thereof with plugged apertures of the flange.

As best illustrated in FIG. 2, the core barrel 21 has a cylindrical wall section 61 from which flange 23 extends outwardly. The flange 23 has a plurality of apertures 63 therethrough which communicate with the annulus 47 when the core barrel is positioned within the pressure vessel 3. The apertures 63 are normally closed with a removable plug 65. The purpose of the apertures 63, which normally have a diameter of about 2.25 inches (5.72 cm), is normally to enable the removal of specimens from the radiation specimen pockets 55 which are located about the outer periphery of the core barrel cylindrical wall section, eight of such apertures being illustrated in FIG. 2, although more or less than this number of apertures may be provided.

Figure 3:
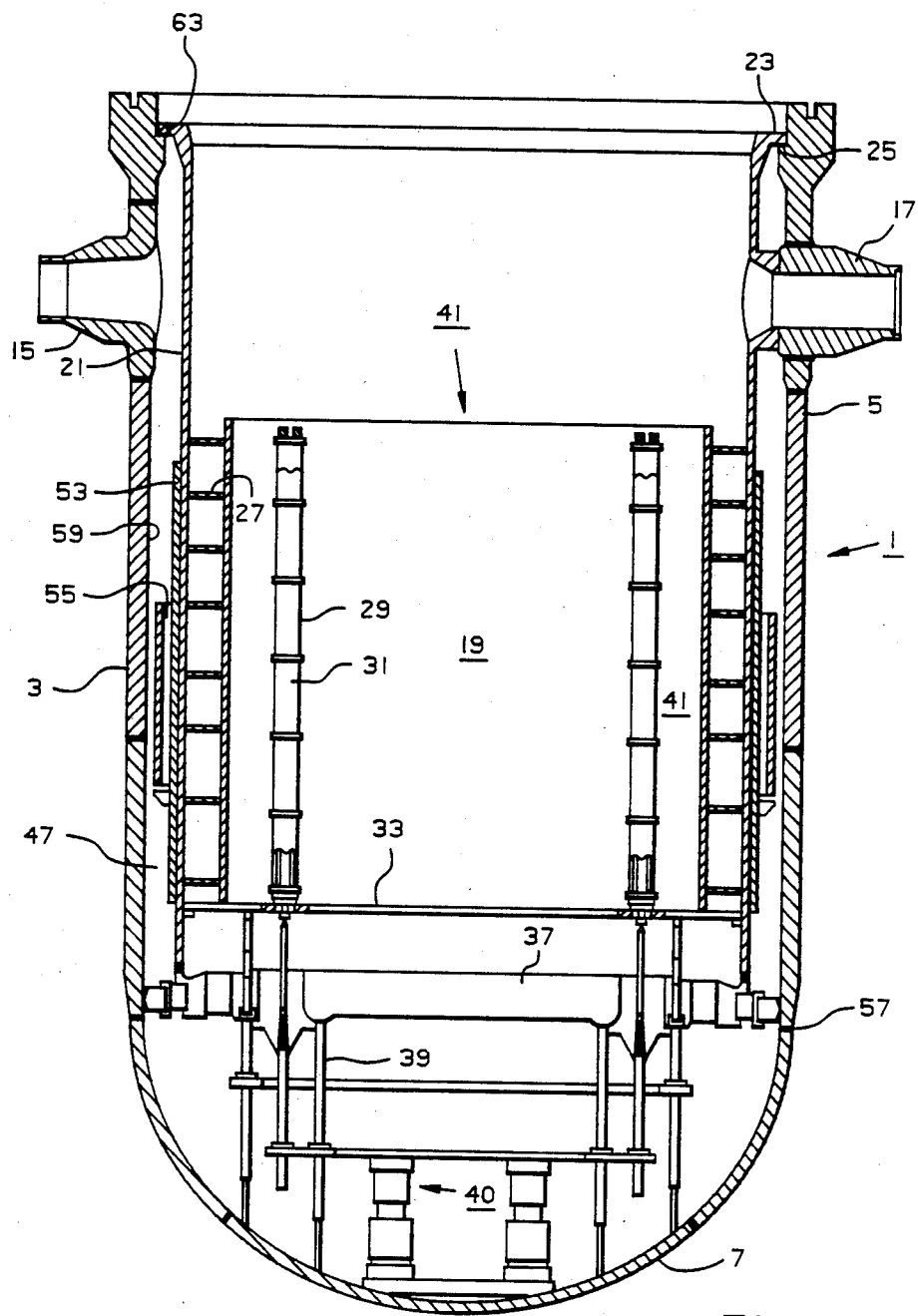
FIG. 3 is an elevational view, in cross-section of the pressurized water reactor of FIG. 1 with the head and upper internals removed.

As illustrated in FIG. 3, the removal of the head of the pressure vessel and the upper internals can be affected while leaving the core barrel 21 and core 19 intact in the pressure vessel 3. The present invention enables inspection of the welds 57 and internal surface 59 of the pressure vessel wall 5 while the reactor is in such a partially dismantled condition. When the head of the pressure vessel and upper internals have been removed, the vessel is normally flooded with water to protect against radioactivity, and the present method can be carried out under such flooded conditions.

In the present method, access to the annular chamber is provided by either removing a plug from an existing aperture through the flange of the core barrel or by forming an additional aperture, which could be about 3.5 inches (8.89 cm) in diameter, through said flange, which additional aperture is subsequently provided with a plug, which may also be removable. A means for inspecting a weld or the inner surface of the pressure vessel wall is inserted through the access into the annular chamber and positioned proximate the area to be inspected. The means for inspecting, which is inserted through the access, may be an ultrasonic testing device, a visual examining means such as an optical scanning device, or other inspecting means, dependent upon the type of inspection desired. Ultrasonic testing, which is normally used, involves the injection of pulses of high frequency sound into the component to be tested. Any internal defects reflect sound back to the transmitting transducer, which then acts as a receiver. Such ultrasonic testing has a high sensitivity for cracks and other planar defects and can measure both length and height of a defect. Such testing is conventionally used on various components.

Figure 4:
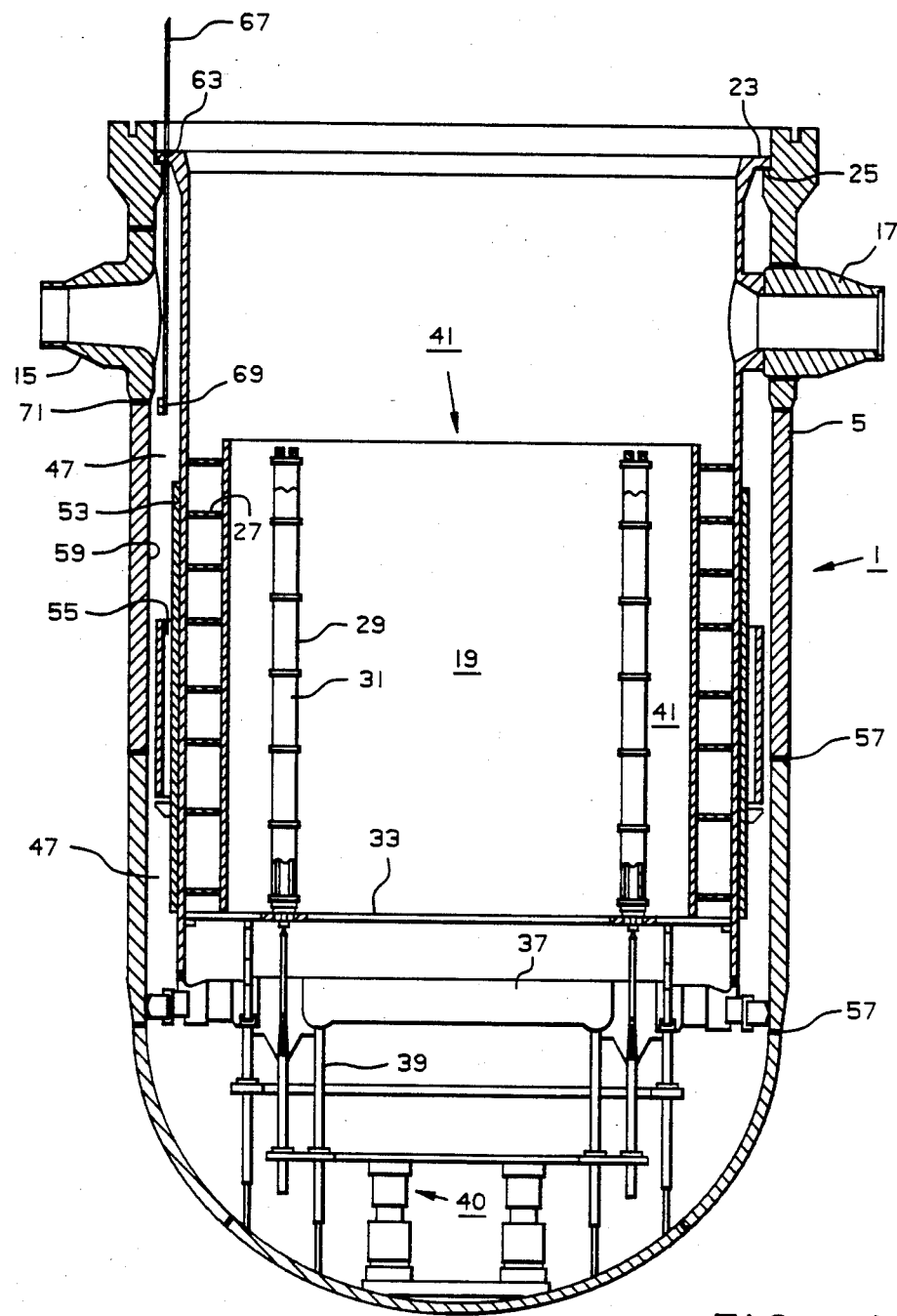
FIG. 4 is a view similar to FIG. 3 illustrating the insertion of an inspection means into the annular chamber for inspection of a weld, according to the method of the present invention.

The method is schematically illustrated in FIG. 4, wherein inspection of a weld 71 in the pressure vessel wall 5 is effected. As illustrated, the head 9 and upper internals 45 have been removed from the reactor but the lower internals 41 remain in position. After removal of any plug in the aperture 63 illustrated, an inspecting means 69, on the end of a positioning tool 67, such as a sonic tester, is inserted through the aperture 63 into the annular chamber 47, and is positioned proximate the inner surface of the weld 71. The actual positioning of the inspecting means relative to the area to be inspected will vary dependent upon the particular inspecting means used. The inspecting means is positioned at a location that is proximate the area, i.e. at a location that is sufficient to enable the desired examination or testing of the area by the inspecting means. The sonic tester, or sensor, 69 is then activated to inspect the weld 71, with such inspection being effected while the lower internals 41, including the core barrel 21, are still positioned within the pressure vessel 3. After the inspection, the inspecting means is retrieved through the aperture and the aperture plugged.

The inservice inspections, of predetermined selected areas of the inner vessel surface and welds, according to the present method, may be made during normal plant outages such as refueling shutdowns or maintenance shutdowns occurring during a scheduled interval without the need for removing the lower internals from the pressure vessel. Since removal of the lower reactor internals is not required, labor savings are achieved and a reduction of man REM exposure is also achieved, as compared with previous processes that require the removal of the lower reactor internals.

What is claimed is:

1. A method for inservice inspection of a predetermined area of the wall of a pressurized water nuclear reactor pressure vessel wherein said nuclear reactor has a substantially cylindrical pressure vessel wall, with a plurality of inlet and outlet nozzles therein, and a generally cylindrical vertically oriented core barrel having an upper flange disposed within said pressure vessel, with an annular chamber formed between said pressure vessel wall and said barrel, said upper flange resting upon a ledge about the inner periphery of the upper section of said pressure vessel wall, comprising:

providing access to said annular chamber through the flange of said core barrel, while said core barrel is disposed within said pressure vessel;

inserting a means for inspecting said predetermined area through said access;

positioning said inspecting means in proximity to said predetermined area of said pressure vessel wall to be inspected; and inspecting said predetermined area by said inspecting means while said barrel remains disposed within said pressure vessel.

2. The method for inservice inspection as defined in claim 1 wherein the upper flange of said core barrel has a plurality of apertures therethrough which communicate with said annular chamber and a removable plug within each said aperture, and wherein access to said annular chamber is provided by removing at least one of said plugs.

3. The method for providing inservice inspection as defined in claim 1 wherein access to said annular chamber is provided by forming an aperture through the upper flange of said core barrel, which aperture communicates with said annular chamber.

4. The method for providing inservice inspection as defined in claim 1 wherein said means for inspecting said predetermined area comprises means for ultrasonic testing of said predetermined area.

5. The method for providing inservice inspection as defined in claim 1 wherein said means for inspecting said predetermined area comprises means for visual examination of said predetermined area.

6. The method for inservice inspection as defined in claim 1 wherein said predetermined area includes a weld in said pressure vessel wall.

7. The method for inservice inspection as defined in claim 6 wherein said means for inspecting said weld comprises means for ultrasonic testing of said weld.

8. The method for inservice inspection as defined in claim 1 wherein a nuclear core is present within said core barrel.

9. A method for inservice inspection of predetermined welds present in the wall of a pressurized water nuclear reactor pressure vessel wherein said nuclear reactor has a substantially cylindrical pressure vessel wall, with a plurality of inlet and outlet nozzles therein, and a generally cylindrical, vertically oriented core barrel having an upper flange disposed within said pressure vessel, with an annular chamber formed between said pressure vessel wall and said barrel, said upper flange resting upon a ledge about the inner periphery of the upper section of said pressure vessel wall, comprising:

providing access to said annular chamber through the flange of said core barrel, while said core barrel is disposed within said pressure vessel, and wherein the upper flange of said core barrel has a plurality of apertures therethrough which communicate with said annular chamber and a removable plug within each said aperture, by removing at least one of said plugs;

inserting a means for inspecting a weld, present in the wall of the pressure vessel, through said aperture with said plug removed;

positioning said inspecting means in proximity to said weld in said pressure vessel wall to be inspected; and inspecting said weld by said inspecting means while said barrel remains disposed within said pressure vessel.

10. The method for inservice inspection as defined in claim 9 wherein said means for inspecting said weld comprises means for ultrasonic testing of said weld.

11. The method for inservice inspection as defined in claim 10 wherein a nuclear core is present within said core barrel.

* * * * *